July 13, 1954  T. M. CLARK  2,683,322
FISHING TACKLE RETRIEVER
Filed May 8, 1953
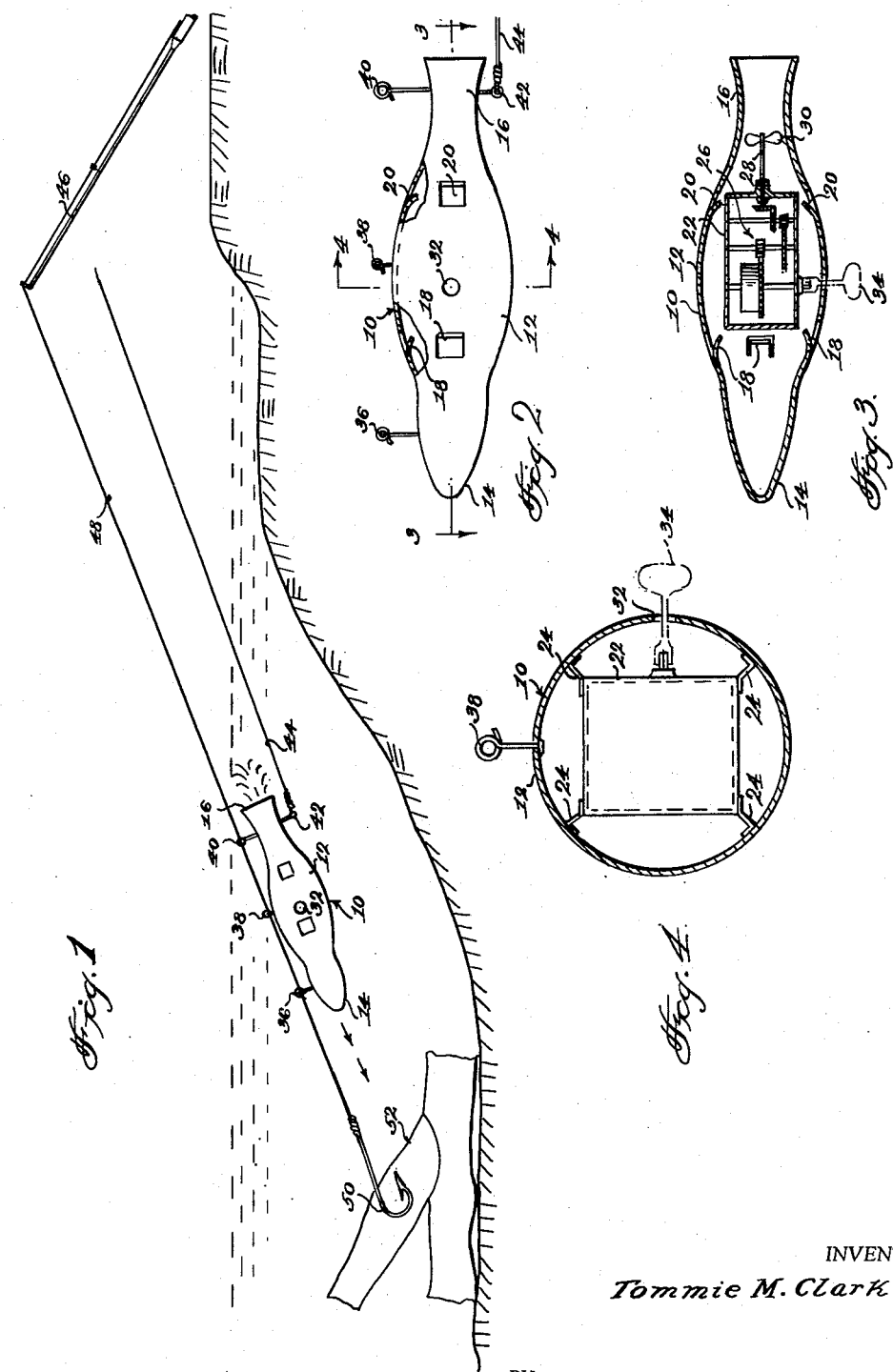
INVENTOR
Tommie M. Clark
BY
McMorrow, Berman & Davidson
ATTORNEYS Patented July 13, 1954

2,683,322

UNITED STATES PATENT OFFICE 2,683,322

FISHING TACKLE RETRIEVER

Tommie M. Clark, Eastland, Tex.

Application May 8, 1953, Serial No. 353,783

2 Claims. (Cl. 43—17.2)

This invention relates to apparatus for retrieving a snagged fishing line. More particularly, the invention has regard to a device of the character referred to, which can be slidably mounted upon a line which is caught upon an underwater obstruction, the device being so formed as to be propelled along said line to the vicinity of the obstruction, there to act upon the line in such a manner as to disengage the same, in a majority of instances, from the object on which the line is caught.

Heretofore, devices of the character referred to have, in general, been so designed as to merely gravitate along the snagged line, to the vicinity of the underwater obstruction. One important object of the present invention, accordingly, is to provide a fishing tackle retriever of the type referred to which will be power driven, thus to cause the retriever to be forcibly propelled along the line in such a manner as to cause the retriever to set up a positive force, when it reaches the underwater obstruction, tending to quickly dislodge the tackle from said obstruction.

Another object of importance is to provide a retriever as described which will be so designed as to set up a vibratory motion in the vicinity of the underwater obstruction, which vibratory motion will act either independently or in concert with the forward propulsion means of the device, in such a manner as to efficiently act upon the snagged tackle and dislodge the same from the underwater obstruction.

Another object of importance is to provide retrieving apparatus as stated which can be swiftly attached to or detached from a snagged fishing line, thereby to facilitate the disengagement of the line from the underwater obstruction.

Yet another object is to provide a retrieving device as stated wherein the propulsion means constituting an important component of said device will be very inexpensive, and will comprise, mainly, a key-wound spring motor, and a propeller blade driven by said motor in such a manner as to cause water to be circulated within and through the body of the device, thereby to propel said body forcibly along the snagged line, at a rather substantial rate of speed.

Another object is to provide a fishing tackle retriever as stated which will be so shaped as to slide along an underwater obstruction such as a rock, log, or the like, thereby to exert lateral pressure against the snagged line tending to disengage the line from the obstruction.

Other objects will appear from the following description, the claims appended thereto, and from the annexed drawing, in which like reference characters designate like parts throughout the several views, wherein:

Figure 1 is a somewhat diagrammatic view of a fishing tackle retriever formed in accordance with the present invention, as it appears when in use;

Figure 2 is a side elevational view of the retriever per se, portions being shown in section;

Figure 3 is a longitudinal sectional view through the retriever, taken substantially on line 3—3 of Figure 2; and Figure 4 is an enlarged, transverse sectional view taken substantially on line 4—4 of Figure 2.

The device constituting the present invention has been designated generally by the reference numeral 10, and includes a shell or hollow body 12 which is of generally elongated formation, said body having a tapered construction at its opposite ends. Thus, the body 12 is thickest at its midlength point, the body tapering as at 14 toward its front end, and tapering as at 16 toward its rear end. The tapered front end is rounded to provide a nose on the body, which nose will be so shaped as to offer a minimum resistance to the water, when the body is being propelled along a snagged fishing line. The rounded nose is further adapted to act, in cooperation with the thickened midlength portion of the body, in sliding along an underwater obstruction in such a way as to exert a lateral pressure against a fishing line snagged on said obstruction, tending to dislodge the line.

Considering the particular formation of the tapered tail portion 16, it may be noted that said tail portion, after tapering to a minimum cross sectional area, is flared slightly at the rear end of the body, said rear end being formed open as best shown in Figure 3.

At selected locations, the body or shell 12 is cut along U-shaped lines, to define portions which are in-struck as at 18, 20 respectively, thereby to form water inlet openings. As will be noted, the in-struck portions 18 are located forwardly of the midlength point of the body, at the base of the rounded nose, said portions 18 being spaced equal distances apart circumferentially of the shell or body 12. Similarly, the portions 20 are spaced equal distances apart circumferentially of the body, at that part of the body at which the thickened midlength portion merges into the tapered tail portion 16.

Within the body, between the portions 18, 20, a rectangular, open frame 22 is mounted, said frame being spaced inwardly from the wall of the midlength portion of the body (see Figure 4) through the medium of spider arms 24. A spring motor designated generally by the reference numeral 26 is of conventional design, and is mounted in the frame 22. The spring motor could, as will be appreciated, be of the inexpensive type often used as prime movers for children's toys.

The motor 26 drives a propeller shaft 28 arranged longitudinally and centrally of the body 12, said shaft 28 extending into the tapered tail portion 16 and being fitted, within said tail portion, with propeller blades 30. The propeller blades 30 are so pitched as to cause water to be drawn through the openings 18, 20, said water being expelled out of the open rear end of the shell 12, thus to propel the shell forcibly through the water in the direction of the arrows shown in Figure 1.

In the wall of the shell 12, intermediate the opposite ends thereof, an opening 32 is formed, a winding key 34 being extendable through said opening for the purpose of rewinding the spring motor.

Guide members are provided upon the shell, for the purpose of slidably mounting the device upon a snagged fishing line. Said guide members have been designated by the reference numerals 36, 38, 40, the guide members being spaced longitudinally of the shell. Each guide member can be formed from a length of wire or rod material, the outer end of which is shaped into a guide loop, the several loops being aligned longitudinally of the body.

It is also desirable that means be provided for pulling the device back along the fishing line, and accordingly, an eye 42 is secured to the tail portion 16, a retrieving line 44 being connected to said eye.

A conventional fishing rod has been designated by the reference numeral 46, and as shown in Figure 1, said fishing rod has a fishing line 48 the hook 50 of which is snagged upon an underwater obstruction 52 such as a sunken log. To retrieve the snagged tackle, one would simply extend the line 48 through the loops of the guide members 36, 38, 40. The spring motor is then wound, and on movement of the device into the water, said device will be forcibly propelled along the line 48 to the underwater obstruction. In many instances, the propelling force will itself be sufficient to dislodge the tackle from said obstruction, since the device will tend to continue past the snagged portion of the line, thereby pulling said snagged portion off the obstruction 52.

In other instances, the obstruction may be so shaped as to stop the device at the location at which the line 48 is snagged. In these instances, the motor 26, continuing to operate, sets up a vibratory motion which is transmitted through the guide members to the line 48, thus to set up a corresponding vibration in the line tending to disengage the same from the underwater obstruction.

In still other instances, the body will slide along the surface of the underwater obstruction, this action being particularly facilitated by reason of the shape of the nose and midlength portion of the body. It will be understood that the sliding of the device along the surface of the underwater obstruction sets up a lateral pressure upon the fishing line 48, tending to disengage the snagged line from the obstruction.

Of course, a battery can be used to furnish power, instead of a spring, in some commercial embodiments of the invention.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A fishing tackle retriever comprising: a hollow, relatively elongated body having a rounded nose and formed with water inlet openings intermediate its ends; guide means carried by said body for slidably mounting the same upon a snagged line, said body being slidable along said line to the vicinity of an underwater obstruction on which the line is caught; a spring motor mounted within the body; and propeller means driven by said spring motor, said propeller means being disposed at the rear end of the body and said rear end of the body being formed open, for circulation of water through said inlet openings of the body and out the rear end of the body, thereby to propel the body along the snagged line to the point at which the line is caught.

2. A fishing tackle retriever comprising: a body including a plurality of guide members spaced longitudinally thereof, said guide members projecting laterally of the body in one direction and having eyes aligned longitudinally of the body, said eyes being adapted for extension therethrough of a snagged line, thus to slidably mount the body upon said line for movement to the vicinity of an underwater obstruction on which the line is caught, the body tapering toward the opposite ends thereof with one end of the body being closed and the other end being formed open; and propulsion means contained within said body and including a motor and a propeller blade driven by said motor, said body having inlet openings for water disposed in advance of said propeller blade and said propeller blade being so pitched as to draw water through said inlet openings and force the same out the rear end of the body, thereby to propel the body along the snagged line, said motor being adapted to transmit vibration through said guide members to the snagged line to dislodge the line from the underwater obstruction.

References Cited in the file of this patent
UNITED STATES PATENTS

| Number | Name | Date |
|---|---|---|
| 1,850,296 | Vermeulen | Mar. 22, 1932 |
| 1,992,619 | Johnson | Feb. 6, 1935 |
| 2,083,218 | Carter | June 8, 1937 |
| 2,562,413 | Carr | July 31, 1951 |